United States Patent
Wheeler et al.

(10) Patent No.: US 10,102,702 B1
(45) Date of Patent: Oct. 16, 2018

(54) AUTOMOTIVE POWERED DOOR ACTIVATION USING ACCELEROMETER

(71) Applicant: FORD GLOBAL TECHNOLOGIES, LLC, Dearborn, MI (US)

(72) Inventors: Joshua R. Wheeler, Trenton, MI (US); Scott A. Amman, Milford, MI (US); Ranjani Rangarajan, Farmington Hills, MI (US); Leah N. Busch, Dearborn, MI (US); An Ji, West Bloomfield, MI (US); John E. Huber, Novi, MI (US)

(73) Assignee: FORD GLOBAL TECHNOLOGIES, LLC, Dearborn, MI (US)

(*) Notice: Subject to any disclaimer, the term of this patent is extended or adjusted under 35 U.S.C. 154(b) by 0 days.

(21) Appl. No.: 15/665,685

(22) Filed: Aug. 1, 2017

(51) Int. Cl.
| | | |
|---|---|---|
| *B60R 25/00* | (2013.01) | |
| *G07C 9/00* | (2006.01) | |
| *G10L 15/22* | (2006.01) | |
| *E05F 15/73* | (2015.01) | |
| *B60J 5/04* | (2006.01) | |
| *G01P 15/00* | (2006.01) | |

(52) U.S. Cl.
CPC ........ *G07C 9/00563* (2013.01); *B60J 5/0486* (2013.01); *E05F 15/73* (2015.01); *G01P 15/005* (2013.01); *G10L 15/22* (2013.01); *E05F 2015/763* (2015.01); *G08C 2201/31* (2013.01); *G10L 2015/223* (2013.01)

(58) Field of Classification Search
None
See application file for complete search history.

(56) References Cited

U.S. PATENT DOCUMENTS

| | | | |
|---|---|---|---|
| 7,034,485 | B2 | 4/2006 | Kuan et al. |
| 7,688,179 | B2 * | 3/2010 | Kurpinski ........... B60R 25/2036 340/4.1 |
| 8,022,808 | B2 | 9/2011 | Kurpinski et al. |
| 8,077,022 | B2 | 12/2011 | Baruco et al. |
| 8,451,087 | B2 | 5/2013 | Krishnan et al. |
| 8,717,429 | B2 * | 5/2014 | Giraud ................... E05B 81/78 348/77 |
| 9,580,046 | B2 | 2/2017 | Luu et al. |
| 9,816,308 | B2 * | 11/2017 | Myers ..................... E05F 15/73 |
| 2008/0154613 | A1 | 6/2008 | Haulick et al. |
| 2014/0169139 | A1 | 6/2014 | Lee |
| 2017/0030133 | A1 | 2/2017 | Elie et al. |

OTHER PUBLICATIONS

Bolzmacher, C. & Le Guelvouit, V. Microsyste Technol (2016) 22:1653 https://doi.org/10.1007/s00542-015-2795-x.

* cited by examiner

*Primary Examiner* — K. Wong
(74) *Attorney, Agent, or Firm* — Frank A. MacKenzie; MacMillan, Sobanski & Todd, LLC

(57) ABSTRACT

Voice control is extended outside of an automotive vehicle by an access system associated with a door and window. An accelerometer is mounted on the window to generate a vibration signal. A passive entry system generates an unlock standby signal when an authorized user carrying a wireless fob is detected proximate the door. A voice recognizer in the vehicle is activated by the standby signal to scan the vibration signal for a spoken command for opening the door. A door actuator is activated by the voice recognizer when the command is detected.

20 Claims, 3 Drawing Sheets

AUTOMOTIVE POWERED DOOR ACTIVATION USING ACCELEROMETER

CROSS REFERENCE TO RELATED APPLICATIONS

Not Applicable.

STATEMENT REGARDING FEDERALLY SPONSORED RESEARCH

Not Applicable.

BACKGROUND OF THE INVENTION

The present invention relates in general to accessing an automotive vehicle or vehicle functions using spoken voice commands outside the vehicle, and, more specifically, to an access system that uses a vehicle window as part of a microphone-like structure for detecting spoken voice commands.

Passive keyless entry is a technology wherein the user of a vehicle is able to unlock the vehicle doors without manually inserting a key in a lock. Instead, the user carries a wireless transponder or transceiver (i.e., a fob) which carries security data that is automatically exchanged with the vehicle in order to authenticate the user. Touching a door handle is often used to initiate interrogation of the fob within a small region surrounding the door.

Some vehicle doors, such as a rear liftgate on a sport utility vehicle or a sliding side door on a minivan, may include powered actuators for opening the door. Activation of the powered doors can typically be done remotely by pressing a corresponding button on the fob. In order to enable a more passive method of opening the powered door (such as when the user's hands are full and it is inconvenient to press a fob button), vehicles have been introduced wherein door activation can be done by waving a foot underneath the door to trigger an ultrasonic sensor or laser sensor arranged to detect motion in a target area beneath the door. However, some problems have been encountered with these activation systems when the user's foot does not achieve the correct placement beneath the sensor, or when the sensor becomes dirty from road debris or mud or snow. Unintended opening is also possible if the user inadvertently causes motion in the target area for a purpose unrelated to opening the door. Some users may also find it difficult to hold large loads in their hands while having to stand on one foot to activate the sensor. Additionally, the motion/proximity sensors tend to be relatively expensive.

SUMMARY OF THE INVENTION

The invention provides an improved hands-free door opening system that overcomes the foregoing problems by using exterior voice control to open the door wherein the window of the door acts as a "microphone" by placing an accelerometer on the glass. This avoids the problems associated with placement of a conventional microphone in the harsh environment outside of the car. In addition, a voice recognition (VR) system (also known as an automatic speech recognition system or ASR system) is integrated with a passive entry system to ensure that an authorized user is present before the VR system actively "listens" for relevant voice commands.

In one aspect of the invention, a vehicle having a vehicle security feature comprises a door with a window. An accelerometer is mounted on the window to generate a vibration signal. A passive entry system generates an unlock standby signal when an authorized user is detected proximate the door. A voice recognizer is activated by the standby signal to scan the vibration signal for a spoken command for the vehicle security feature and to initiate a recognized command.

According to a further aspect of the invention, a vehicle access system comprises a door with a window. An accelerometer is mounted on the window to generate a vibration signal. A passive entry system generates an unlock standby signal when an authorized user is detected proximate the door. A voice recognizer is activated by the standby signal to scan the vibration signal for a spoken command for opening the door. A door actuator is activated by the voice recognizer when the command is detected.

DETAILED DESCRIPTION OF PREFERRED EMBODIMENTS

Figure 1:
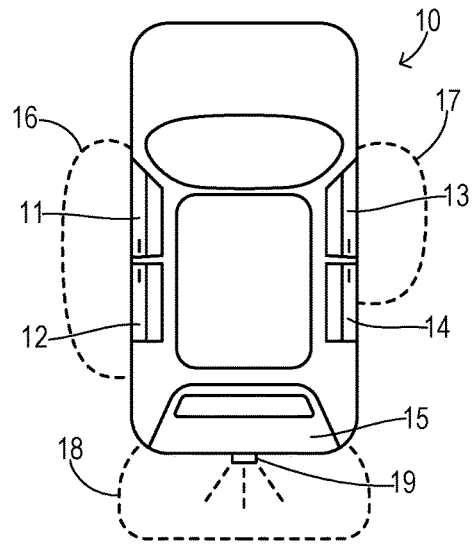
FIG. 1 is a top view of a conventional automotive vehicle showing passive entry zones and foot sensor for opening a rear liftgate.

FIG. 1 shows an automotive passenger vehicle 10 with driver-side doors 11 and 12, passenger-side doors 13 and 14, and rear liftgate 15. A passive entry system in vehicle 10 creates user detection zones 16, 17, and 18 using short range RF communication signals via separate antennas (not shown) at the respective door locations. A passive entry sensor used to initiate door unlocking and/or opening may include a proximity/motion sensor 19 installed beneath liftgate 15 arranged to sense passage of a user's foot as an indication to open liftgate 15 if the passive entry system detects an authorized user within zone 18. The passive entry system can be configured as a passive entry/passive start (PEPS) system as disclosed in U.S. Pat. No. 9,580,046, entitled Entry Assist System For A Motor Vehicle, which is incorporated herein by reference.

Figure 2:
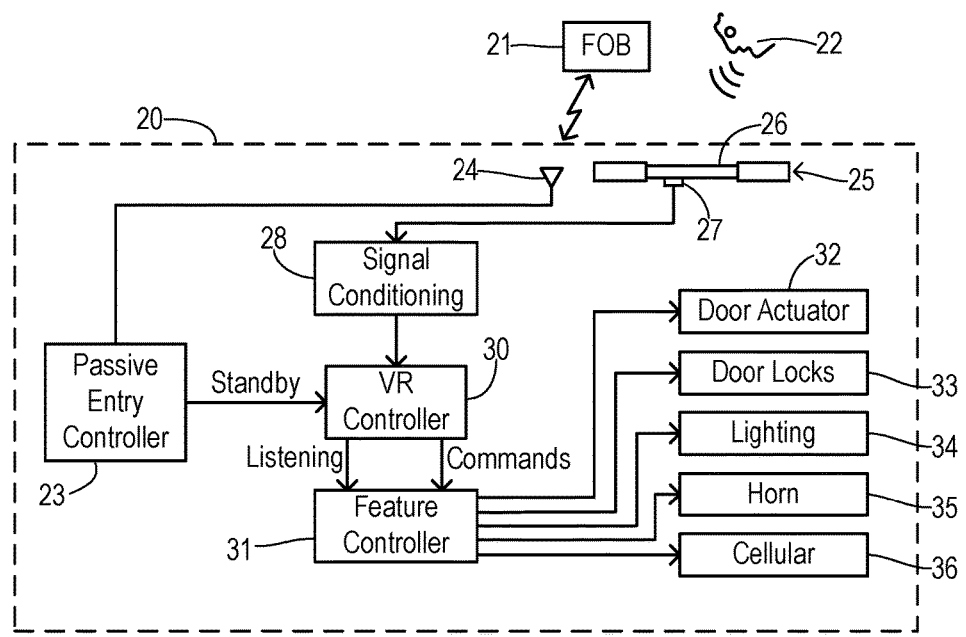
FIG. 2 is a block diagram showing one preferred embodiment of a vehicle and an access control system of the present invention.

A first embodiment of the invention is shown in FIG. 2 wherein a vehicle 20 is accessible using a key fob 21 carried by a user 22. Based on exchange of unique identification data, fob 21 can successfully authenticate user 22 using wireless communication with a passive entry controller 23 via an antenna 24. Antenna 24 is located at a vehicle closure 25 (e.g., side door or rear liftgate) to locate user 22 and tailor the passive door operation according to the location. Door 25 includes a glass panel (i.e., window pane) 26 which carries an accelerometer 27. Sound (such as speech uttered by user 22) is a mechanical wave that causes oscillation as it travels through the air and impinges on glass panel 26. The oscillation is measured as a vibration by accelerometer 27, and the resulting electrical output from accelerometer 27 is then interpreted as "sound."

The output signal from accelerometer 27 is coupled through a signal conditioning block 28 to a voice recognition (VR) controller 30. VR controller 30 also receives an unlock standby signal from passive entry controller 23 during the times when authorized fob 21 is detected. In particular, passive entry controller 23 is a polling-type of passive entry system wherein a short-range, low frequency transmitter broadcasts a challenge signal at timed intervals (i.e., a polling signal). One example of a known polling system is shown in U.S. Pat. No. 8,451,087, entitled "Passive Entry System For Automotive Vehicle Doors," which is incorporated herein by reference. Such a conventional passive entry system enters an unlock standby mode whenever a fob responds with correct authentication data, and then waits for further action such as touching of a door handle or motion within a sensor field of view in order to initiate door unlocking or powered opening. Polling has been used in order to ensure a rapid unlocking of the door as soon as the user grasps the handle. The present invention uses the unlock standby signal to put VR controller 30 into a listening mode which monitors the accelerometer output signal for spoken commands.

A feature controller 31 is coupled to VR controller 30 to receive command signals generated by VR controller 30 when various spoken commands are recognized within the accelerometer "microphone" signals. Controller 31 may be coupled to various automotive systems or features including a door actuator 32, electronic door locks 33, an accessory lighting system 34, a vehicle horn 35, and a wireless communication (e.g., cellular telephone) system 36. The many possible recognized command functions that can be initiated by a spoken command from user 22 that is picked up by accelerometer 27 and recognized by VR controller 30 include vehicle security features such as liftgate or sliding door opening (via actuator 32), door unlocking (via locks 33), activation of various light sources (via lighting system 34), and an emergency notification such as triggering a panic alarm (having audible and/or visible alerts via horn 35 and/or lighting system 34) or initiating wireless communication to a remote emergency response entity (e.g., via a 911 call using cellular system 36).

Figure 3:
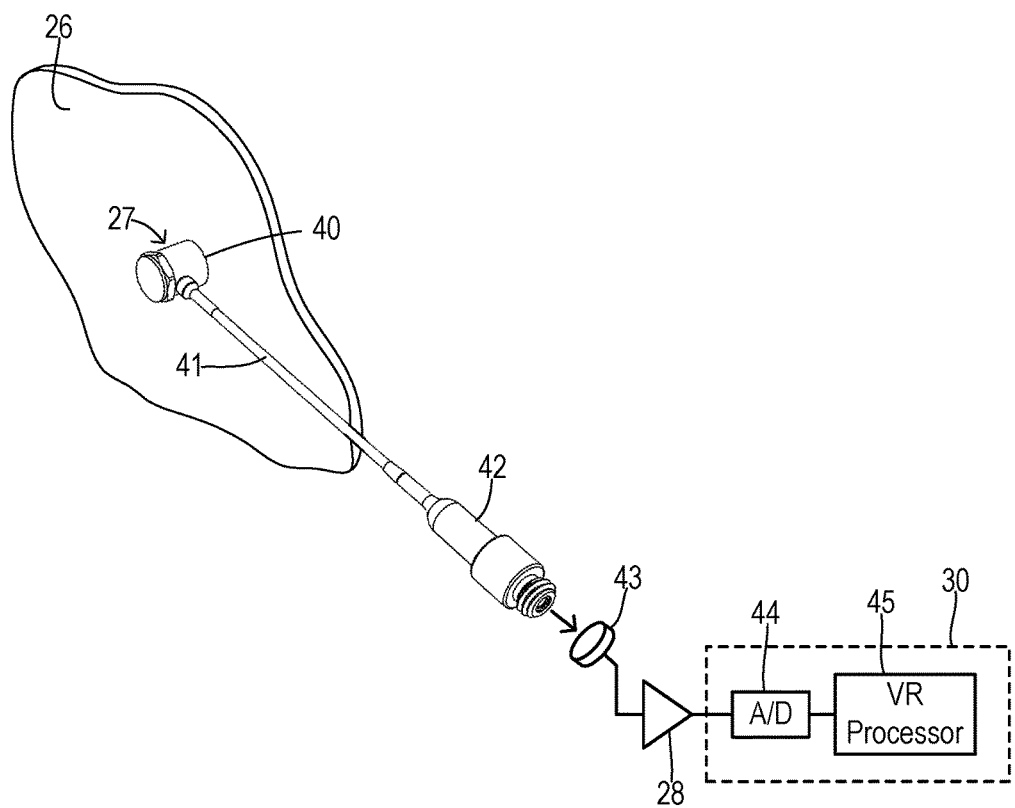
FIG. 3 is a diagram showing an accelerometer mounting and signal processing of the invention in greater detail.

FIG. 3 shows one preferred embodiment of an accelerometer 27 rigidly mounted to window 26 by an adhesive. Accelerometer 27 may, for example, include a quartz shear element in a steel enclosure, such as a model 3032M9 accelerometer available from Dytran Instruments, Inc., of Chatsworth, Calif. Accelerometer 27 is oriented so that its sensing axis is perpendicular to the surface of window 26. A coaxial cable 41 conveys an accelerometer signal via connector plugs 42 and 43 (e.g., BNC connectors) to signal conditioning circuit 28 (such as an amplifier). The conditioned accelerometer signal is provided to VR controller 30 which includes an analog-to-digital converter 44 and a VR processor 45.

Figure 4:
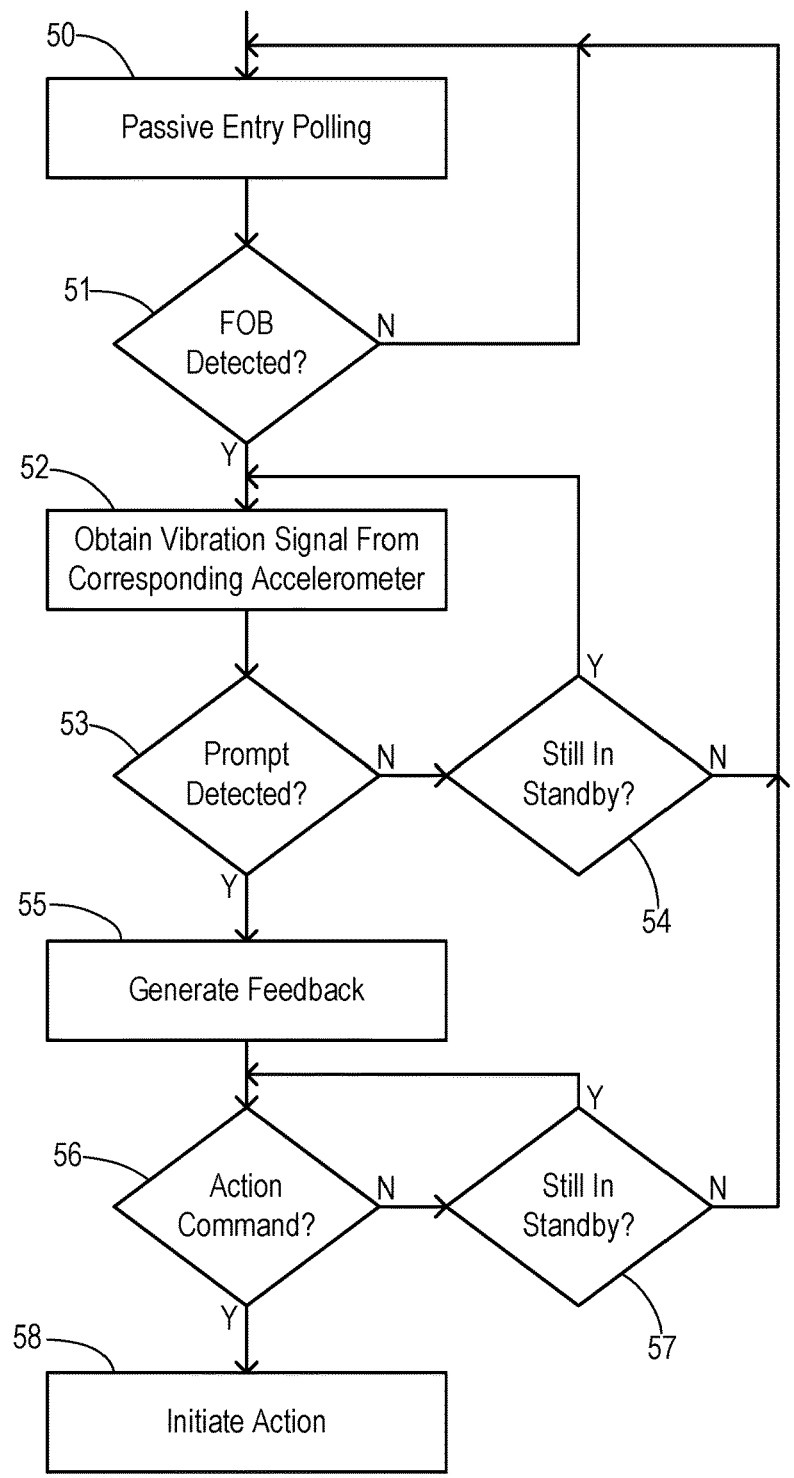
FIG. 4 is a flowchart showing one preferred method of the invention.

One preferred method of the invention is shown in FIG. 4. With the vehicle locked and unoccupied, the passive entry system performs polling in step 50 wherein a challenge signal is broadcast that can be received by a user fob that enters a predetermined zone proximate to a vehicle door (e.g., a side door or a rear liftgate). After broadcasting a challenge signal, the passive entry system listens for a response. When a response is received, it is checked for valid authentication data in step 51. If a valid response is not detected, then the method returns to step 50 for continued polling. If a valid response is detected in step 51, then the accelerometer is activated (e.g., the accelerometer located on the window panel of the door corresponding to the zone within which the user fob is detected) and a resulting vibration signal is obtain in step 52 for processing by the VR controller.

In order to avoid false activations and to simplify detection of spoken commands, the spoken commands preferably include two parts wherein a first part is comprised of an utterance of a prompting or wake-up word and a second part is comprised of an action indicator. A prompt or wake-up word can preferably be a word or phrase that is unique (i.e., unlikely to be used in other conversation). For example, in a vehicle manufactured by Ford Motor Company having its popular SYNC® system with voice recognition, the prompt could be the phrase "Hey SYNC." Thus, a complete command could be "Hey SYNC, open liftgate" or "Hey SYNC, unlock all doors."

In step 53, a check is made to determine whether the prompt has been detected. Since the VR controller in only monitoring for the prompt, it is possible to reliably detect the existence of a spoken command with low probability of false activations and with a minimal processing load. If a prompt is not detected then a check is performed in step 54 to determine whether the unlock standby signal is still being received. If not, then a return is made to step 50 for ongoing polling. If the standby signal is still present, then a return is made to step 52 to obtain further vibration signals for ongoing monitoring for the prompt.

When a prompt is detected in step 53, then feedback can optionally be generated in step 55 to inform the user that the VR controller has been activated and is listening for an action indicator. A user feedback signal can include a flashing of the vehicle taillights or running lights and/or a chirp on the vehicle horn. for example. The user feedback signal confirms to the user that the prompt has been recognized when it has been spoken or warns the user that an action might be inadvertently initiated when the prompt was not intentionally uttered by the user. Nevertheless, step 55 is optional and can be omitted.

In step 56, the VR system monitors the ongoing vibration signals for utterance of an action indicator (e.g., "open liftgate"). If an action indicator is not detected, then a check is made in step 57 to determine whether the unlock standby signal is still being received. If not, then a return is made to step 50 for ongoing polling. If the standby signal is still present, then a return is made to step 56 to obtain further vibration signals for ongoing monitoring for an action indicator. When an action indicator is detected, then the corresponding action is initiated in step 58.

In the present invention, use of an accelerometer to obtain vibration signals from a vehicle panel onto which soundwaves from a user's speech impinge is facilitated by placing the accelerometer in an environmentally protected location, such as inside the passenger cabin. The use of a glass panel at a height close to an average person's height and a nearly vertical orientation helps ensure good interaction between the panel and the soundwaves. Most preferably, a non-laminated glass surface may be used to provide the best signal-to-noise ratio (since there is less damping from a laminate layer between sheets of glass).

What is claimed is:

1. A vehicle having a vehicle security feature, comprising:
   a door with a window;
   an accelerometer mounted with a sensing axis perpendicularly upon the window, generating a window vibration signal;
   a passive entry system generating an unlock standby signal when an authorized user is proximate the door; and
   a voice recognizer activated by the standby signal to scan the vibration signal for a spoken command for the security feature and to initiate a recognized command.

2. The vehicle of claim 1 further comprising a door actuator coupled to the door, wherein the security feature is comprised of automatic powered opening of the door, wherein the spoken command is comprised of a door opening command, and wherein the door actuator initiates opening of the door when the voice recognizer detects the door opening command while the standby signal is being generated.

3. The vehicle of claim 1 wherein the door is a rear liftgate on a rear side of the vehicle.

4. The vehicle of claim 1 wherein the door is a power sliding door on a lateral side of the vehicle.

5. The vehicle of claim 1 further comprising a plurality of doors with respective remote controlled door locks, wherein the security feature is comprised of unlocking the doors, wherein the spoken command is comprised of a door unlocking command, and wherein the door actuator initiates unlocking of at least one door when the voice recognizer detects the door unlocking command while the standby signal is being generated.

6. The vehicle of claim 1 further comprising a vehicle lighting system, wherein the security feature is comprised of activating the lighting system, wherein the spoken command is comprised of a lighting command, and wherein the lighting system initiates lighting system activation when the voice recognizer detects the lighting command while the standby signal is being generated.

7. The vehicle of claim 1 further comprising an emergency notification system, wherein the spoken command is comprised of an emergency command, and wherein the emergency notification system initiates a notification when the voice recognizer detects the door unlocking command while the standby signal is being generated.

8. The vehicle of claim 7 wherein the notification is comprised of an audible and visible panic alarm generated by the vehicle.

9. The vehicle of claim 7 wherein the notification is comprised of a wireless communication to an emergency response entity.

10. The vehicle of claim 1 wherein the accelerometer is rigidly affixed to an inside surface of the window.

11. The vehicle of claim 1 wherein the spoken command includes a prompting utterance and an action indicator.

12. The vehicle of claim 1 wherein the voice recognizer is configured to initiate checking for the prompting utterance in response to the standby signal and to activate a user feedback signal upon detecting the prompting utterance.

13. The vehicle of claim 12 wherein the feedback signal is comprised of flashing a taillight on the vehicle.

14. A vehicle access system, comprising:
a door with a window;
an accelerometer mounted with a sensing axis perpendicularly upon the window, generating a window vibration signal;
a passive entry system generating an unlock standby signal when an authorized user is proximate the door;
a voice recognizer activated by the standby signal to scan the vibration signal for a spoken door opening command; and
a door actuator activated by the voice recognizer when detecting the command.

15. The system of claim 14 wherein the door is a rear liftgate on a rear side of a vehicle.

16. The system of claim 14 wherein the door is a power sliding door on a lateral side of a vehicle.

17. The system of claim 14 wherein the accelerometer is rigidly affixed to an inside surface of the window.

18. The system of claim 14 wherein the spoken command includes a prompting utterance and an action indicator.

19. The system of claim 18 wherein the voice recognizer is configured to initiate checking for the prompting utterance in response to the standby signal and to activate a user feedback signal upon detecting the prompting utterance.

20. The system of claim 19 wherein the feedback signal is comprised of flashing a taillight on the vehicle.

* * * * *